(12) United States Patent
Sonoda et al.

(10) Patent No.: US 8,872,463 B2
(45) Date of Patent: Oct. 28, 2014

(54) ELECTRIC MOTOR CONTROLLER COMPRISING FUNCTION FOR SIMULTANEOUSLY ESTIMATING INERTIA, FRICTION, AND SPRING

(75) Inventors: Naoto Sonoda, Yamanashi (JP); Yukio Toyozawa, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 156 days.

(21) Appl. No.: 13/493,019

(22) Filed: Jun. 11, 2012

(65) Prior Publication Data

US 2013/0026963 A1 Jan. 31, 2013

(30) Foreign Application Priority Data

Jul. 27, 2011 (JP) .................................. 2011-164503
Nov. 14, 2011 (JP) .................................. 2011-249061

(51) Int. Cl.
  *G05B 19/19* (2006.01)
  *H02P 21/14* (2006.01)
  *H02P 23/14* (2006.01)
  *G05B 13/02* (2006.01)
  *H02P 6/00* (2006.01)

(52) U.S. Cl.
  CPC .............. *H02P 23/14* (2013.01); *H02P 21/148* (2013.01); *H02P 21/143* (2013.01); *G05B 13/0205* (2013.01); *H02P 6/002* (2013.01)
  USPC ....... 318/561; 318/568.22; 318/721; 318/560

(58) Field of Classification Search
  CPC .... F16H 61/061; B60W 10/06; F16D 13/385; G05B 19/19

USPC ....... 700/28–55; 192/13 R; 701/51; 464/68.4; 310/323.02

See application file for complete search history.

(56) References Cited

U.S. PATENT DOCUMENTS 5,159,254 A * 10/1992 Teshima ........................ 318/611
5,442,270 A * 8/1995 Tetsuaki ................... 318/568.22

(Continued)

FOREIGN PATENT DOCUMENTS

CN          1267953  A    9/2000
CN       101232271  A    7/2008

(Continued)

OTHER PUBLICATIONS

Japanese Office Action for Application JP2011-118693 mailed Jan. 29, 2013.

(Continued)

*Primary Examiner* — Paul Ip
*Assistant Examiner* — Zemenay Truneh
(74) *Attorney, Agent, or Firm* — Lowe Hauptman & Ham, LLP (57) ABSTRACT

A sinusoidal command is added to a torque command of a controller to acquire a velocity and a current value of an electric motor. An estimated coupling torque value is calculated by calculating an input torque value from the current value and a torque constant of the electric motor and further calculating a coupling torque value from a velocity difference, motor inertia, and the input torque. An estimated torque error is then calculated from the estimated coupling torque value and the coupling torque value, and inertia, friction, and a spring constant are estimated from the estimated torque error, the velocity, and the coupling torque value.

6 Claims, 9 Drawing Sheets

(56) References Cited

U.S. PATENT DOCUMENTS

| | | | |
|---|---|---|---|
| 5,729,111 A | 3/1998 | Ogura et al. | |
| 5,990,645 A | 11/1999 | Nakamura et al. | |
| 6,211,640 B1 | 4/2001 | Fujisaki et al. | |
| 6,945,375 B2 * | 9/2005 | Kirkwood et al. | 192/84.6 |
| 2003/0088345 A1 | 5/2003 | Akiyama et al. | |
| 2005/0079943 A1 | 4/2005 | Kirkwood et al. | |
| 2007/0164695 A1 | 7/2007 | Hagihara | |
| 2011/0050146 A1 * | 3/2011 | Okita et al. | 318/631 |

FOREIGN PATENT DOCUMENTS

| | | |
|---|---|---|
| CN | 101262199 A | 9/2008 |
| CN | 102006011 A | 4/2011 |
| DE | 102010036500 A1 | 3/2011 |
| EP | 1968184 A2 * | 9/2008 |
| JP | 2008228360 A | 9/2008 |
| JP | 2009303432 A | 12/2009 |
| JP | 2011072178 A | 4/2011 |

OTHER PUBLICATIONS

Office Action issued Jun. 9, 2014, corresponds to Chinese patent application No. 201210262412.3.

Fast Position Control Considering Robot Safety based on Dual Dynamic Torque Compensation. 2008, IEEE, p. 1324-1329.

High Performance Robust Motion Control of Industrial Robot Using Parameter Identification Based on Resonant Frequency. 2004, IEEE, p. 111-116.

Office Action dated Jul. 1, 2014, corresponds to German patent application No. 102012106771.6.

* cited by examiner

ELECTRIC MOTOR CONTROLLER COMPRISING FUNCTION FOR SIMULTANEOUSLY ESTIMATING INERTIA, FRICTION, AND SPRING

RELATED APPLICATIONS

The present application is based on, and claims priority from, Japanese Application Number 2011-164503, filed Jul. 27, 2011 and Japanese Application Number 2011-249061, filed Nov. 14, 2011, the disclosures of which are hereby incorporated by reference herein in their entirety.

BACKGROUND OF THE INVENTION

1. Field of the Invention

The present invention relates to an electric motor controller that uses an electric motor to control driving of a driven body of a machine tool or industrial machinery and, in particular, to an electric motor controller having a function for simultaneously estimating inertia, friction, and a spring of the driven body.

2. Description of the Related Art

Learning magnitudes of inertia and friction of a driven body that is driven by an electric motor is not only important when determining machining conditions of a machine tool or the like but is also important for accurately controlling a drive shaft that drives the driven body.

For example, when determining acceleration and deceleration constants of a command as a machining condition, the magnitudes of inertia and friction must be accurately known in order to fully exploit the accelerating ability of the electric motor. In addition, regarding control, magnitudes of inertia and friction must be accurately known in order to calculate a gain that determines responsiveness of velocity control. Furthermore, robustness of a servo can be enhanced by constructing a disturbance observer using values of inertia and friction.

An electric motor controller comprising a function for simultaneously estimating inertia and friction is disclosed in Japanese Patent Application Laid-open No. 2011-072178. The controller specifically estimates controlled object parameters including nonlinear friction. The technique disclosed in Japanese Patent Application Laid-open No. 2011-072178 targets so-called one-inertial systems in which a controlled object is assumed as being a rigid body, and no disclosures are made in regards to controlled objects having spring characteristics. Many driven bodies in machine tools and industrial machinery cannot be treated as complete rigid bodies. Therefore, when a rigid body is assumed as a controlled object of estimation as is the case of the technique disclosed in Japanese Patent Application Laid-open No. 2011-072178, a problem arises in that the controlled object is limited to rigid bodies or estimation accuracy deteriorates when the controlled object is not a rigid body.

A technique in which a controlled object is assumed as being a resonance model and parameters of the controlled object are estimated by an iterative least square technique is disclosed in Japanese Patent Application Laid-open No. 2008-228360. The technique disclosed in Japanese Patent Application Laid-open No. 2008-228360 has a problem in that estimated friction is limited to linear friction and that nonlinear friction cannot be estimated.

SUMMARY OF THE INVENTION

With the foregoing in view, it is an object of the present invention to provide an electric motor controller capable of simultaneously estimating, in real-time, inertia, nonlinear friction, and a spring of a controlled object.

An electric motor controller according to the present invention has a function for simultaneously estimating inertia, friction, and a spring, wherein an electric motor, which is a controlled object, drives a driven body of a machine tool or industrial machinery, the electric motor and the driven body are coupled to each other by a coupling shaft having resonance characteristics including a spring. In addition, and the controller includes: a command unit that adds an M-sequence command or a sinusoidal command to a position command, a velocity command, or a torque command of the controller; a current value acquiring unit that acquires a value of a current flowing through the electric motor for each sampling period; an input torque calculating unit that calculates a value of an input torque to the driven body based on the current value and a torque constant of the electric motor; a velocity acquiring unit that acquires a velocity of the electric motor for each sampling period; a coupling torque calculating unit that calculates a value of a coupling torque applied to the electric motor based on a difference between a velocity acquired by the velocity acquiring unit during a present sampling and a velocity acquired by the velocity acquiring unit during a previous sampling, the inertia of the electric motor, and the input torque value calculated by the input torque calculating unit; an estimated coupling torque calculating unit which estimates inertia, viscous friction, and Coulomb's friction of the driven body and a spring constant of the spring of the coupling shaft based on the velocity of the electric motor and the coupling torque value, and which estimates the coupling torque value from the estimated inertia, the estimated viscous friction, and the estimated Coulomb's friction of the driven body and the estimated spring constant; an estimated torque error calculating unit that calculates an estimated torque error by subtracting the estimated coupling torque value estimated by the estimated coupling torque calculating unit from the coupling torque value calculated by the coupling torque calculating unit; and a correcting unit that corrects the estimated inertia, the estimated viscous friction, the estimated Coulomb's friction, and the estimated spring constant for each sampling period so that the estimated torque error calculated by the estimated torque error calculating unit is minimum.

The estimated coupling torque value can be obtained based on: a product of a difference in velocity of the electric motor that is acquired for each sampling period and the estimated inertia; a product of a velocity acquired for each sampling period and the estimated viscous friction of the driven body; a product of a polarity of a velocity acquired for each sampling period and an estimated Coulomb's friction of a load; a product of a second-order difference of the coupling torque value and a reciprocal of the estimated spring constant; and a product of a difference of the coupling torque value, a reciprocal of the estimated inertia, the estimated viscous friction, and the estimated spring constant.

The correcting unit corrects the estimated inertia, the estimated viscous friction, the estimated Coulomb's friction, and the estimated spring constant for each sampling period by using a velocity of the electric motor, the coupling torque value, and an accommodation coefficient so that the estimated torque error calculated by the estimated torque error calculating unit is minimum, and the accommodation coefficient is inversely proportional to magnitudes of the velocity and the coupling torque value and may have a dead zone in which the accommodation coefficient is zero when the velocity is equal to or lower than a predetermined value.

The estimated coupling torque calculating unit is capable of calculating an estimated coupling torque value based on an estimated velocity of the driven body, a velocity of the electric motor, the coupling torque value, the estimated inertia of the driven body, the estimated viscous friction of the driven body, the estimated Coulomb's friction of the driven body, and the estimated spring constant.

An estimated velocity of the driven body can be obtained using a velocity of the electric motor acquired for each sampling period, the coupling torque value, and the estimated spring constant at the time of a previous sampling.

According to the present invention, an electric motor controller which comprises a function for simultaneously estimating inertia, friction, and a spring and which is capable of estimating, in real-time, inertia, nonlinear friction, and a spring can be provided.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The above and other objects and features of the present invention will become apparent from a reading of the following description of the preferred embodiments by reference to the accompanying drawings, wherein.

DESCRIPTION OF THE PREFERRED EMBODIMENTS

Figure 1:
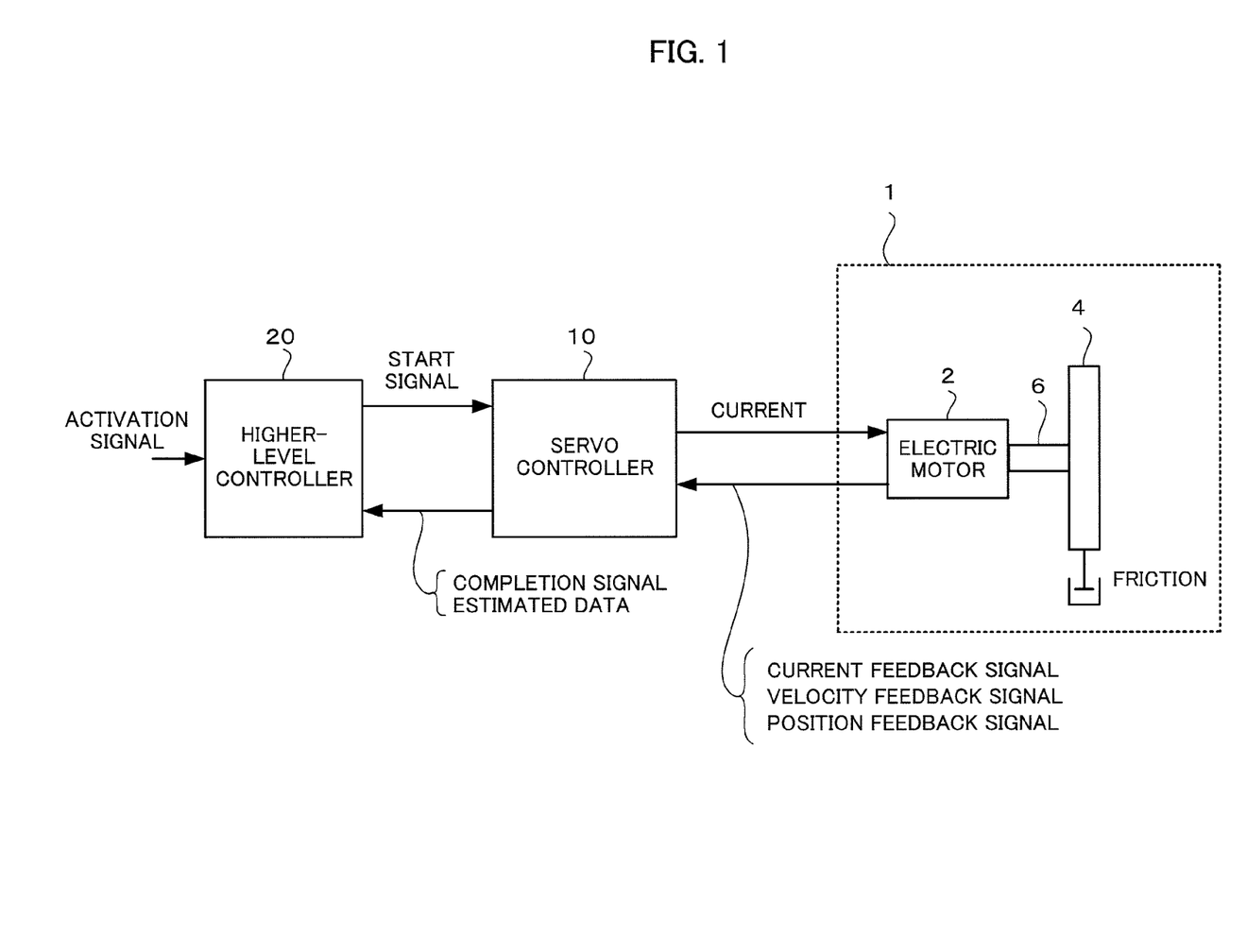
FIG. 1 is a block diagram showing a configuration of a control system.

FIG. 1 is a block diagram showing a configuration of a control system.

As shown in FIG. 1, an object that is directly controlled by a controller according to the present invention is an electric motor 2 that operates a driven body 4. For example, the electric motor 2 is used as a drive force for changing a position or a posture of a table holding a workpiece in a machine tool or industrial machinery or as a drive source for driving a rotation of a robot arm.

The electric motor 2 and the driven body 4 are coupled to each other by a coupling shaft 6. The coupling shaft 6 has resonance characteristics including a spring. For example, the coupling shaft 6 is a mechanism consisting of a ball screw and a nut which transforms a rotational motion into a linear motion, and further includes a decelerator. For example, the controlled object 1 including the driven body 4 also includes a table or a robot arm that holds a workpiece in a machine tool or industrial machinery and the workpiece that is attached and detached by the table or the arm, as well as motion parts such as the coupling shaft 6 and the electric motor 2 itself. Hereinafter, the motion parts of the electric motor 2, the coupling shaft 6, and the driven body 4 will be collectively referred to as the controlled object 1.

The controlled object 1 including the driven body 4 has frictional characteristics consisting of viscous friction and Coulomb's friction, and spring characteristics. A description will be provided later by modeling the controlled object 1 using FIG. 2.

A servo controller 10 controls a position, a velocity, and a torque of the electric motor 2. The servo controller 10 is connected to a higher-level controller 20 such as a CNC (numerical controller) which outputs commands related to a position, a velocity, and a torque of the electric motor 2 in accordance with a work schedule. Moreover, a plurality of servo controllers 10 may be connected to the higher-level controller 20. The higher-level controller 20 functions to transmit a start signal to a sinusoidal command generating unit 40 (refer to FIGS. 2 and 5A to 5C) or an M-sequence command generating unit 41 (refer to FIGS. 6A to 6C) and an estimating unit 30 of the servo controller 10.

Figure 2:
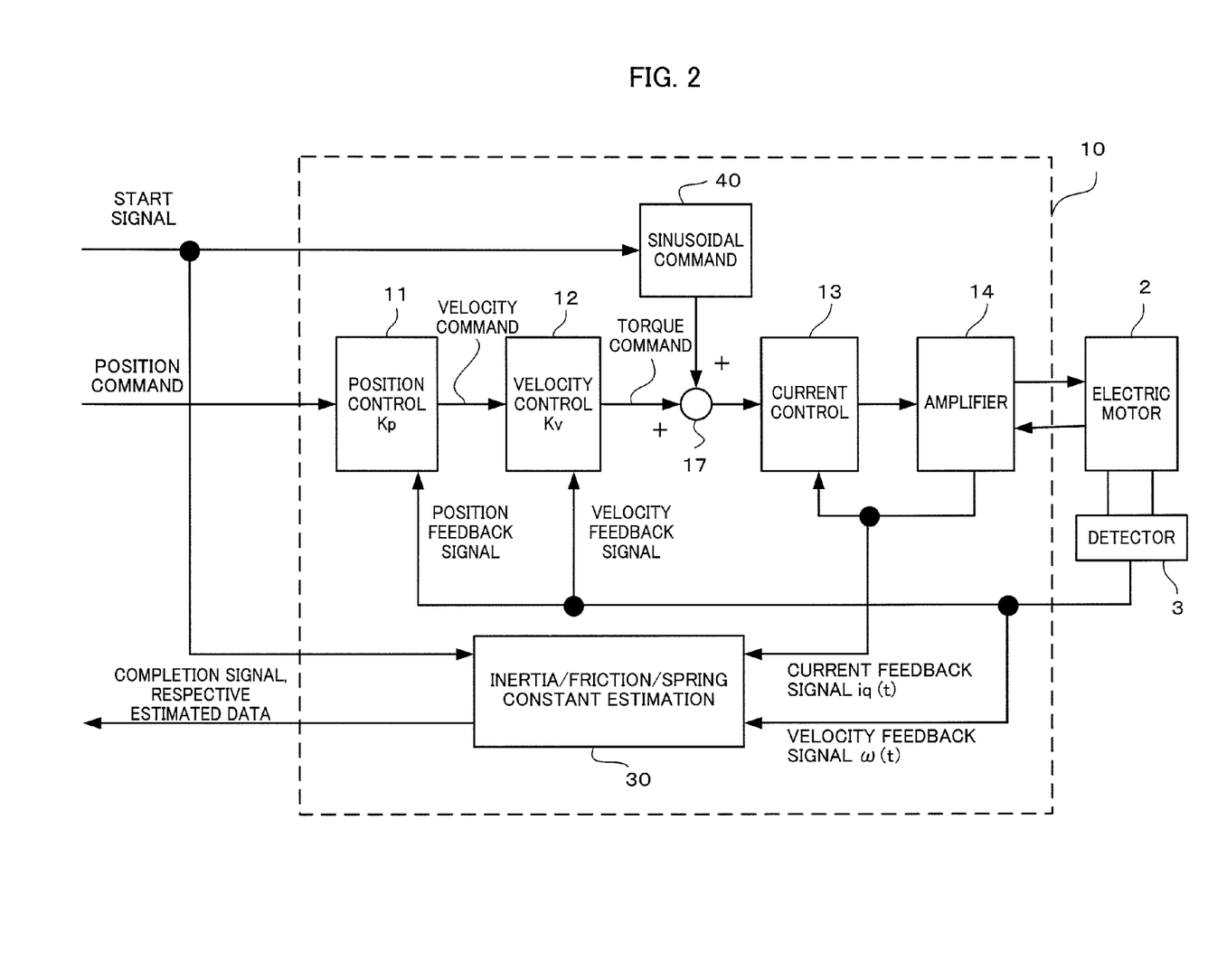
FIG. 2 is a block diagram illustrating a configuration of a servo controller shown in FIG. 1.

FIG. 2 is a block diagram illustrating a configuration of the servo controller 10 shown in FIG. 1 in greater detail.

As shown in FIG. 2, the servo controller 10 comprises a position control unit 11, a velocity control unit 12, a current control unit 13, and an amplifier 14. Based on a position gain Kp and a velocity gain Kv respectively set to the position control unit 11 and the velocity control unit 12, the servo controller 10 operates in correspondence to a command signal from the higher-level controller 20 and a feedback signal related to a position or a velocity from a position/velocity detector 3 attached to the electric motor 2. An output (a PWM signal) of the current control unit 13 is inputted to the amplifier 14. The amplifier 14 controls the supply of power to the electric motor 2 in accordance with the PWM signal received from the current control unit 13.

A velocity feedback signal from the detector 3 attached to the electric motor 2 and a current feedback signal from the amplifier 14 are inputted to the estimating unit 30. The estimating unit 30 functions to simultaneously calculate estimated inertia (moment of inertia), estimated friction force, and an estimated spring constant of the driven body 4 of the controlled object 1 using the received velocity feedback signal and current feedback signal. The estimated data of inertia, the estimated data of frictional force, and the estimated data of the sprint constant of the driven body 4 obtained by calculation are outputted to the higher-level controller 20 together with a completion signal. Moreover, with the frictional force, a viscous frictional force and a Coulomb's frictional force can be calculated separate from each other.

Once the calculation of the respective estimated values of inertia, friction, and a spring constant is finished, the estimating unit 30 functions to respectively transmit the completion signal, the estimated data of inertia (an estimated inertia JL of the driven body), the estimated data of friction force (an estimated viscous frictional force C1, an estimated Coulomb's frictional force C2), and the estimated data of a spring constant (an estimated spring constant Kc) to the higher-level controller 20. The higher-level controller 20 functions to receive the completion signal, the estimated inertia JL, the estimated viscous frictional force C1, the estimated Coulomb's frictional force C2, and the estimated spring constant Kc transmitted from the estimating unit 30.

Figure 3:
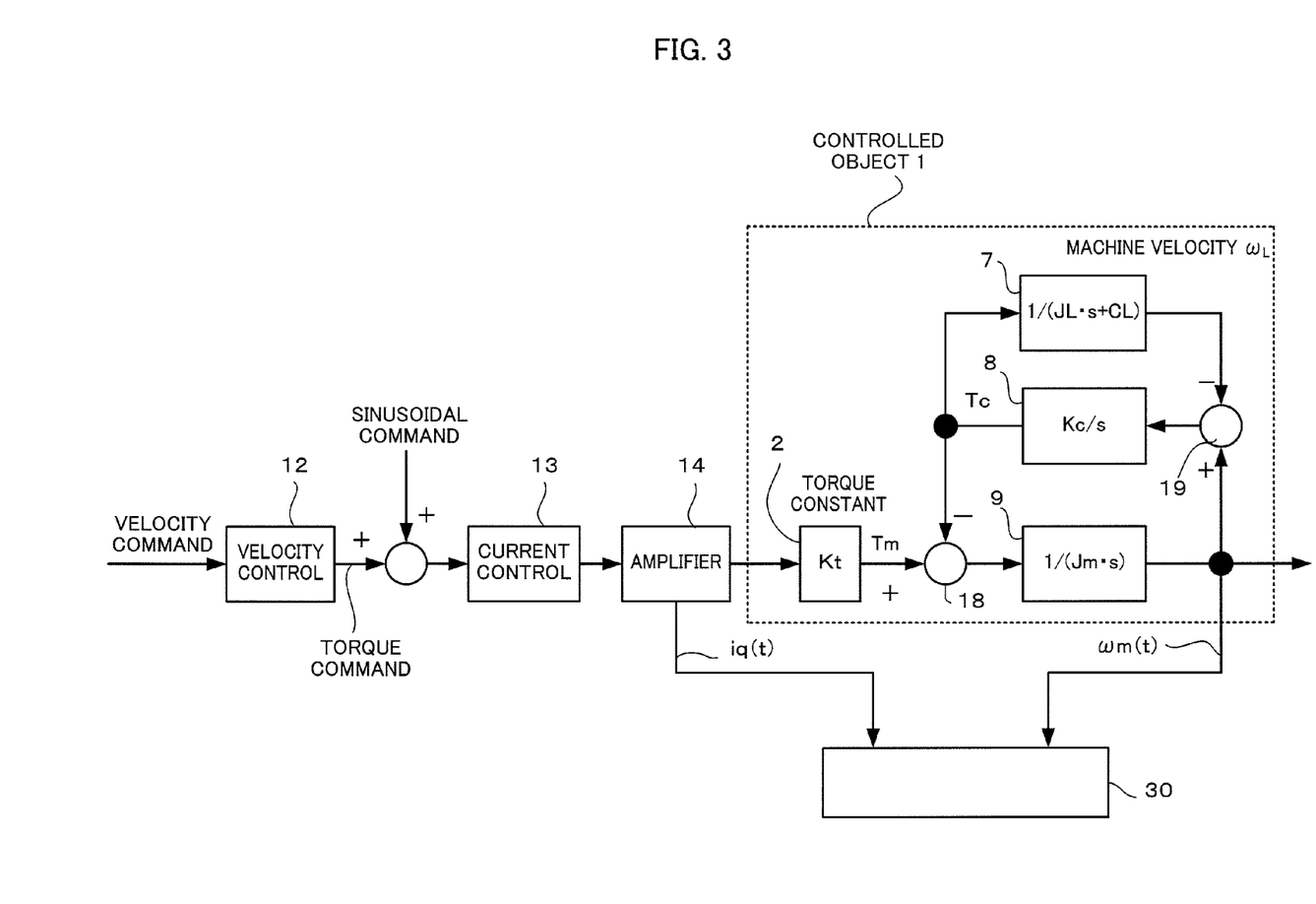
FIG. 3 is a diagram illustrating a controlled object by way of modeling.

FIG. 3 is a diagram illustrating the controlled object 1 by way of modeling.

The controlled object 1 including the motion parts of the electric motor 2, the coupling shaft 6, and the driven body 4 can be modeled using a torque constant Kt of the electric motor 2, a driven body model 7, a spring model 8, and an electric motor model 9. In FIG. 3, s denotes a Laplace transform operator. A subtracter 18 subtracts a coupling torque Tc from an input torque Tm. A difference (Tm−Tc) between the input torque Tm and the coupling torque Tc, outputted from the subtracter 18, is converted into a motor velocity ωm by the electric motor model 9. A machine velocity $\omega_L$ is subtracted from the motor velocity ωm by a subtracter 19, and the subtraction result (ωm−$\omega_L$) is converted into the coupling torque Tc by the spring model 8. The coupling torque Tc is inputted to the subtracter 18 and the driven body model 7. The coupling torque Tc is converted into the machine velocity $\omega_L$ by the driven body model 7.

Figure 4:
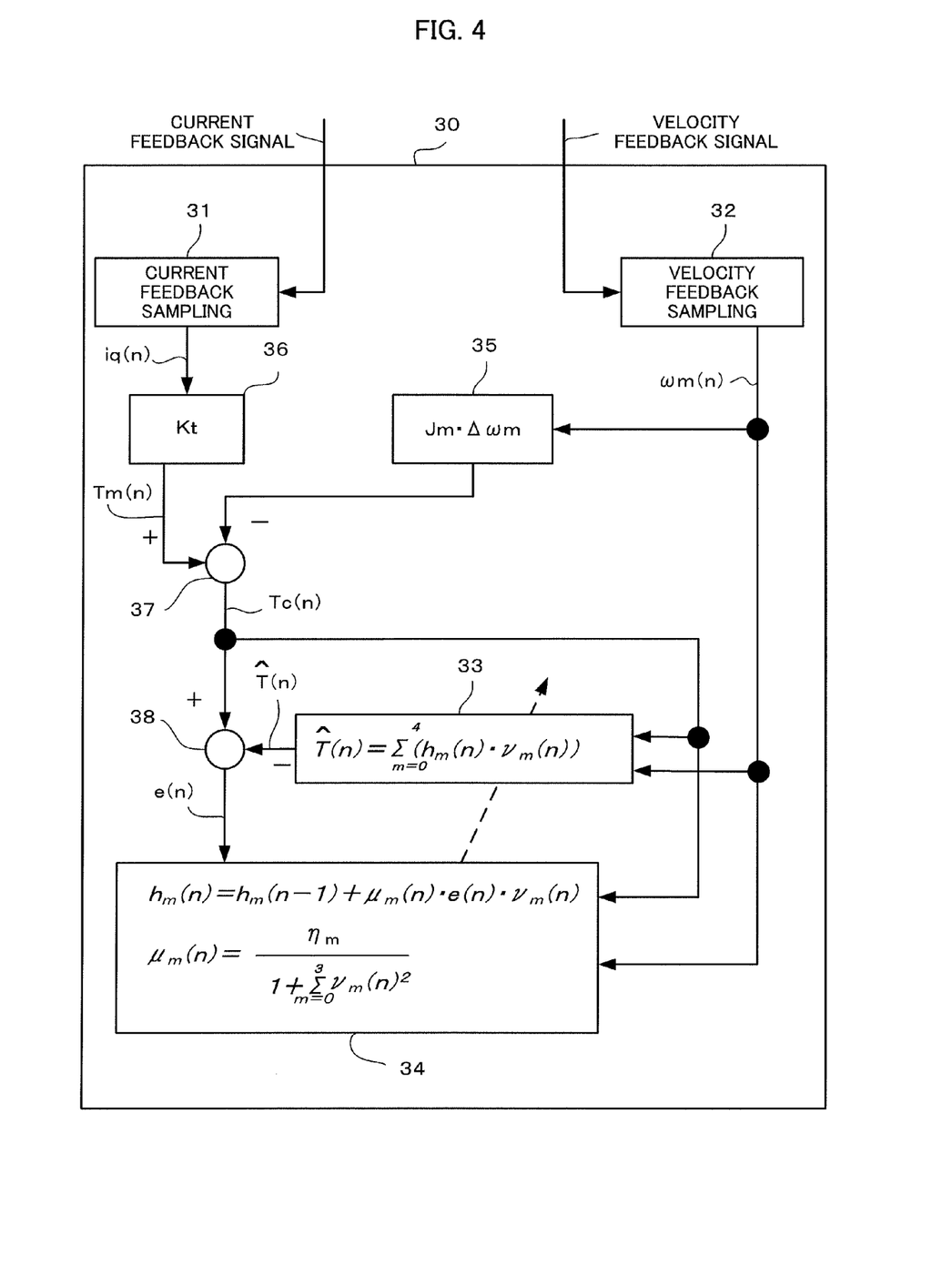
FIG. 4 is a block diagram illustrating a configuration of an estimating unit shown in FIG. 3.

FIG. 4 is a block diagram illustrating a configuration of the estimating unit 30 shown in FIG. 3.

A current feedback sampling unit 31 samples, at a predetermined sampling period T, a current feedback signal iq(t) that is obtained by detecting a current flowing through the electric motor 2 using a current sensor (not shown), and loads the sampled current feedback signal into the estimating unit 30 as a current feedback value iq(n). In a similar manner, a velocity feedback sampling unit 32 samples, at a predetermined sampling period T, a velocity feedback signal ωm(t) outputted from the detector 3 that detects a velocity of the electric motor 2, and loads the sampled velocity feedback signal into the estimating unit 30 as a velocity feedback value ωm(n).

A multiplying unit 35 multiplies inertia Jm of the electric motor by a difference (Δωm) in motor velocity ωm acquired for each sampling period between a value ($\omega m_{n-1}$) taken at a previous sampling and a value ($\omega m_n$) taken at a present sampling, and outputs a multiplication result (Jm×Δωm) to a subtracting unit 37. An input torque calculating unit 36 calculates an input torque value Tm(n) by multiplying the current feedback value iq(n) by a torque constant Kt of the electric motor 2. The subtracting unit 37 calculates a coupling torque value Tc(n) applied to the electric motor 2 by subtracting the value (Jm×Δωm) outputted from the multiplying unit 35 from the input torque value Tm(n) calculated by the input torque calculating unit 36. The coupling torque value Tc(n) outputted from the subtracting unit 37 is inputted to a subtracting unit 38 and an inverse modeling unit 33. In this case, the multiplying unit 35, the input torque calculating unit 36, and the subtracting unit 37 constitute a "coupling torque calculating unit".

The subtracting unit 38 calculates an estimated torque error e(n) by subtracting the estimated coupling torque value expressed as Tc(n) with a superscripted "^", which is outputted from the inverse modeling unit 33, from the coupling torque value Tc(n) outputted from the subtracting unit 37, and outputs the estimated torque error e(n) to the correcting unit 34. The subtracting unit 38 constitutes an "estimated torque error calculating unit".

The inverse modeling unit 33 calculates the estimated coupling torque value expressed as T(n) with a superscripted "^" using Formula (1) below.

$$\hat{T}(n) = h_0 \cdot v_0(n) + h_1 \cdot v_1(n) + h_2 \cdot v_2(n) + h_3 \cdot v_3(n) + h_4 \cdot v_4(n) \quad (1)$$

$$h_0 = \frac{JL}{T}$$

$$h_1 = C1$$

$$h_2 = C2$$

$$h_3 = -\frac{h_0}{Kc \cdot T}$$

$$h_4 = \frac{h_1 \cdot h_3}{h_0}$$

$$v_0(n) = \Delta\omega_m(n)$$

$$v_1(n) = \omega_m(n)$$

$$v_2(n) = \text{sgn}(\omega_m(n))$$

$$v_3(n) = \Delta^2 Tc(n)$$

$$v_4(n) = \Delta Tc(n)$$

In Formula (1), JL denotes estimated inertia of the driven body 4, T denotes a sampling period, C1 denotes estimated viscous friction of a load, C2 denotes estimated Coulomb's friction of the load, Kc denotes an estimated spring constant, ΔTc(n) denotes a difference in coupling torque values, $\Delta^2$Tc(n) denotes a second-order difference in coupling torque values, sgn denotes a sign function, ω(n) denotes a motor velocity, Δω(n) denotes a difference in motor velocity, and T(n) with a superscripted "^" denotes an estimated coupling torque value (n=1, 2, 3, . . . ).

In other words, the estimated coupling torque value expressed as T(n) with a superscripted "^" can be obtained using the motor velocity ω(n), the coupling torque value Tc(n), the estimated inertia JL of the driven body 4, the estimated viscous friction C1 of the load, the Coulomb's friction of the load, and the estimated spring constant. "^" superscripted to T(n) signifies estimation.

Each term of Formula (1) above will now be described. The first term corresponds to a product of a difference in the velocity acquired for each sampling period and the estimated inertia, the second term corresponds to a product of the velocity acquired for each sampling period and the estimated viscous friction of a load, the third term corresponds to a product of a polarity of the velocity acquired for each sampling period and the estimated Coulomb's friction of a load, and the fourth term corresponds to a second-order difference of the coupling torque and a reciprocal of the estimated spring constant. The fifth term corresponds to a product of coefficients obtained by the first, second, and fourth terms and the coupling torque.

Using Formula (2) below based on a steepest descent method so that the estimated torque error e(n) outputted from the subtracting unit 38 is minimum, the correcting unit 34 updates and corrects the estimated inertia JL, the estimated viscous friction C1, the estimated Coulomb's friction C2, and the estimated spring constant Kc of the driven body 4 for each sampling period T using the velocity feedback value ωm(n) and the coupling torque value Tc(n).

More specifically, the correcting unit 34 performs correction by using the estimated inertia JL, the estimated viscous friction C1, the estimated Coulomb's friction C2, and the estimated spring constant Kc of the driven body 4 that comprises the controlled object 1 for each sampling period T. The correcting unit 34 estimates a coefficient of the inverse modeling unit 33 by calculating Formula (2) below so that the estimated torque error e(n) has a small value. By updating and correcting the coefficient of the calculation formula of the inverse modeling unit 33 using the coefficient estimated by the correcting unit 34, the estimated torque error e(n) outputted from the subtracting unit 38 can be made smaller.

$$h_m(n) = \sum_{m=0}^{3} \mu_m(n) \cdot e(n) \cdot v_m(n) \quad (2)$$

$$\mu_m(n) = \begin{cases} \dfrac{\eta_m}{1 + \sum_{m=0}^{3} v_m(n)^2} & (|v_1(n)| \geq \sigma) \\ 0 & (|v_1(n)| < \sigma) \end{cases}$$

In Formula (2), e(n) denotes an estimated torque error, μm(n) denotes an accommodation coefficient, ηm denotes a constant, and σ denotes a velocity dead zone width.

The accommodation coefficient μm(n) is inversely proportional to the magnitudes of velocity and the coupling torque Tc, and a dead zone can be provided so that the accommodation coefficient μm(n) is zero when the velocity is equal to or lower than a predetermined value. Using Formula (2) above, the respective coefficients of the aforementioned Formula (1) based on the steepest descent method are sequentially corrected so as to reduce the estimated torque error of the estimated coupling torque expressed as T(n) with a superscripted "^". At this point, estimation accuracy can be improved by setting a velocity dead zone so as to reduce adverse effects of rapid motions of the electric motor 2 and to reduce the influence of a velocity difference between the electric motor 2 and the driven body 4 as well as by preventing the coefficients of Formula (1) from being corrected at or under a predetermined velocity. As described earlier, ηm is a constant that sets a velocity dead zone. When |v1|<σ, ηm=0.

Figure 5A:
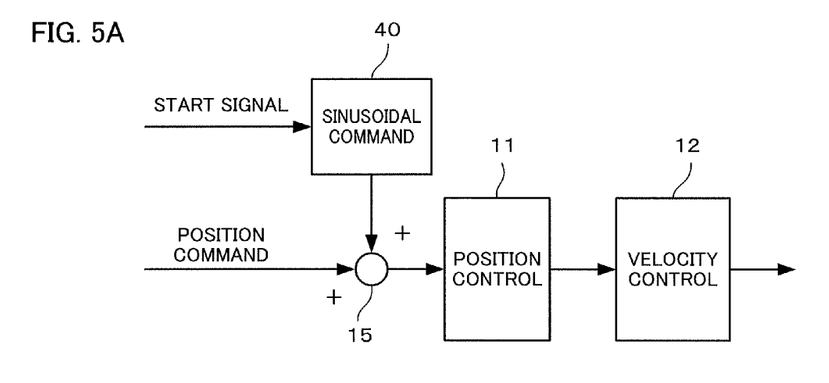
FIGS. 5A and 5B are diagrams illustrating the addition of a sinusoidal command to a position command (FIG. 5A) or to a velocity command (FIG. 5B) by a sinusoidal command unit.
Figure 5B:
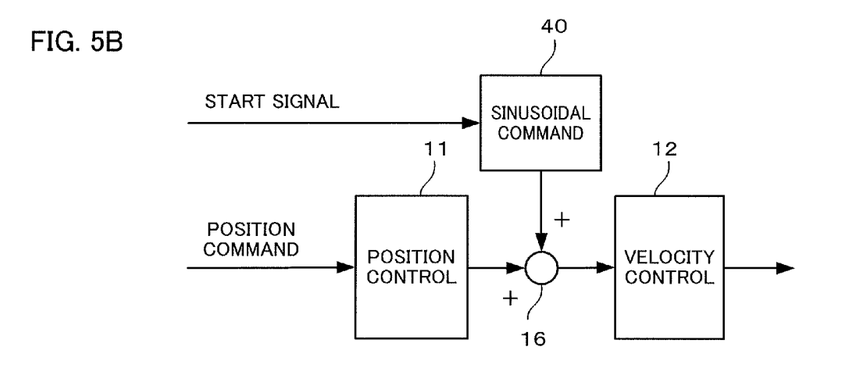
Figure 5C:
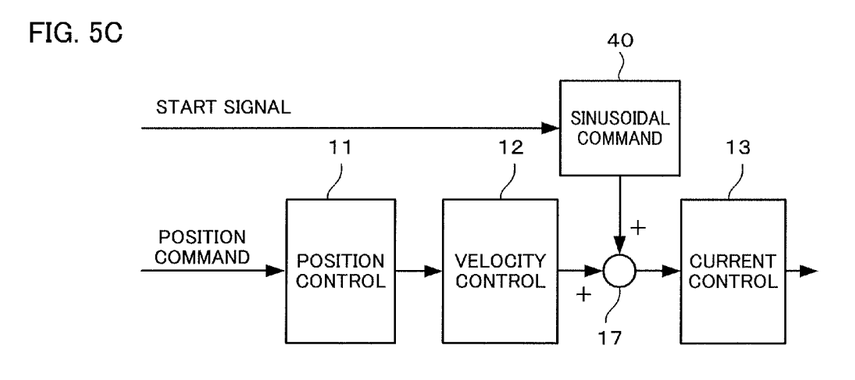
FIG. 5C is a diagram illustrating the addition of a sinusoidal command to a torque command by the sinusoidal command unit in the same manner as shown in FIG. 2.

FIGS. 5A and 5B are diagrams illustrating the addition of a sinusoidal command to a position command or to a velocity command by a sinusoidal command unit.

In FIG. 2 (and FIG. 5C), upon receiving the start signal from the higher-level controller 20, the sinusoidal command generating unit 40 adds a sinusoidal command to a torque command. The present invention is not limited to adding a sinusoidal command to a torque command and, alternatively, a sinusoidal command may be added to a position command as shown in FIG. 5A or a sinusoidal command may be added to a velocity command as shown in FIG. 5B.

Figure 6A:
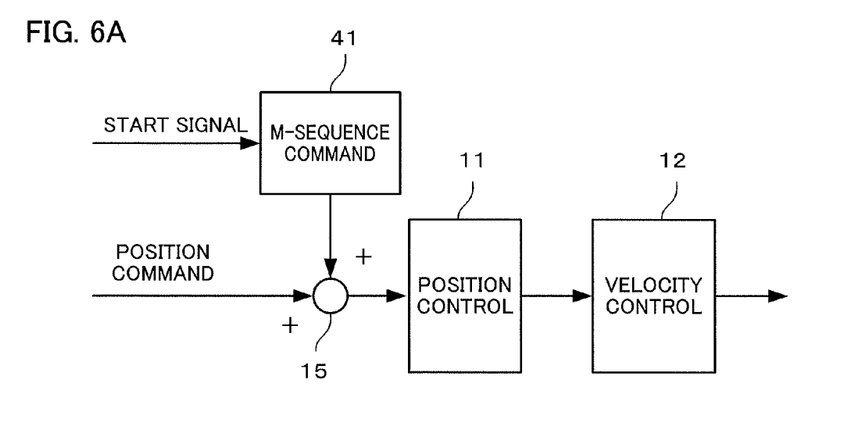
FIGS. 6A to 6C are diagrams illustrating the addition of an M-sequence command to a position command (FIG. 6A), to a velocity command (FIG. 6B), or to a torque command (FIG. 6C) by an M-sequence command generating unit.
Figure 6B:
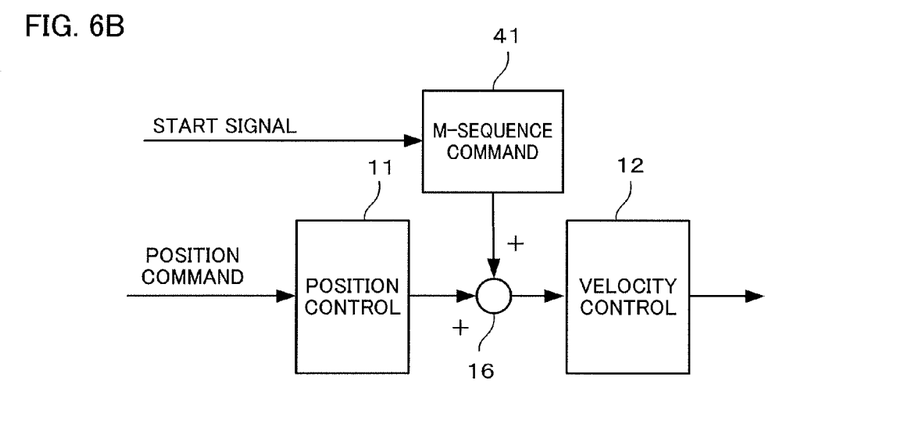
Figure 6C:
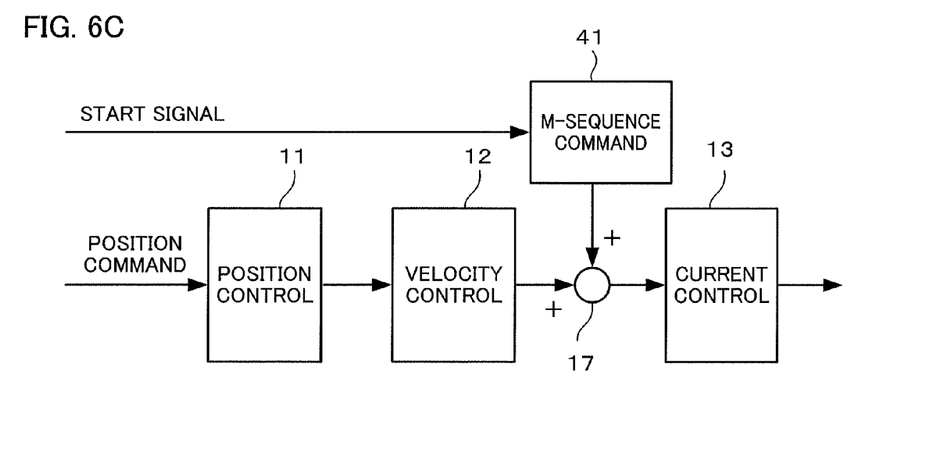

In addition, as shown in FIGS. 6A to 6C, instead of the sinusoidal command unit adding a sinusoidal command to a position command, a velocity command, or a torque command, an M-sequence command may be added by an M-sequence command generating unit 41 to a position command (FIG. 6A), to a velocity command (FIG. 6B), or to a torque command (FIG. 6C).

Figure 7:
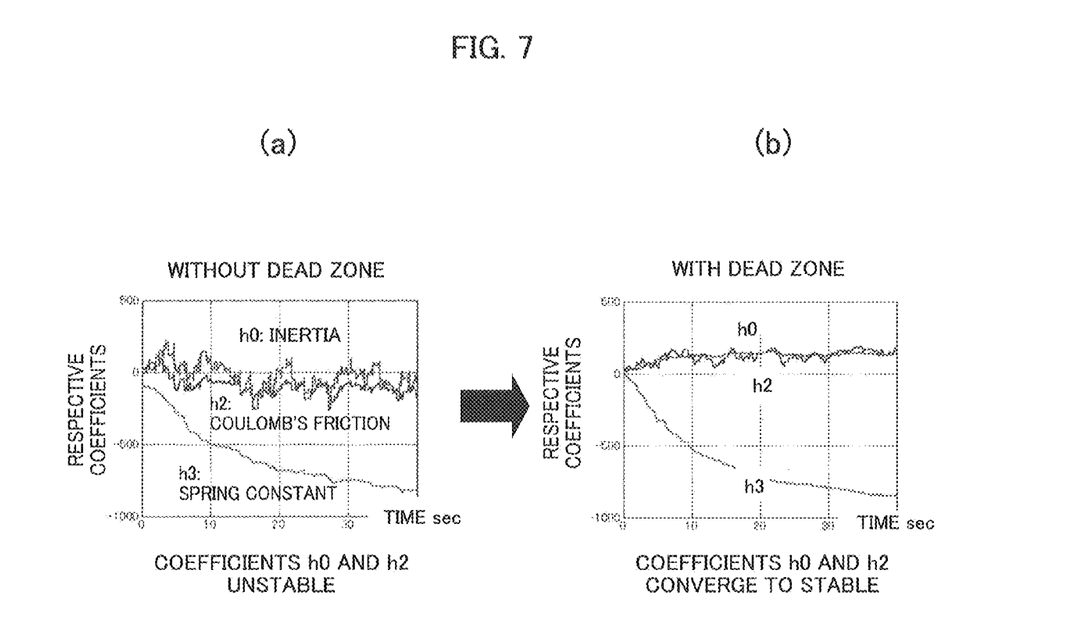
FIG. 7 is a diagram illustrating a change in coefficients in Formula (1) from a case where a velocity dead zone is provided to a case where a velocity dead zone is not provided.

FIG. 7 is a diagram illustrating a change in coefficients in Formula (1) above from a case (b) where a velocity dead zone is provided to a case (a) where a velocity dead zone is not provided. As illustrated by (a) in FIG. 7, coefficients h0 and h2 are unstable when a velocity dead zone is not provided. Conversely, as illustrated by (b) in FIG. 7, coefficients h0 and h2 converge to a stable state over time when a velocity dead zone is provided. Illustration of viscous friction denoted by the coefficient h1 has been omitted here.

Figure 8:
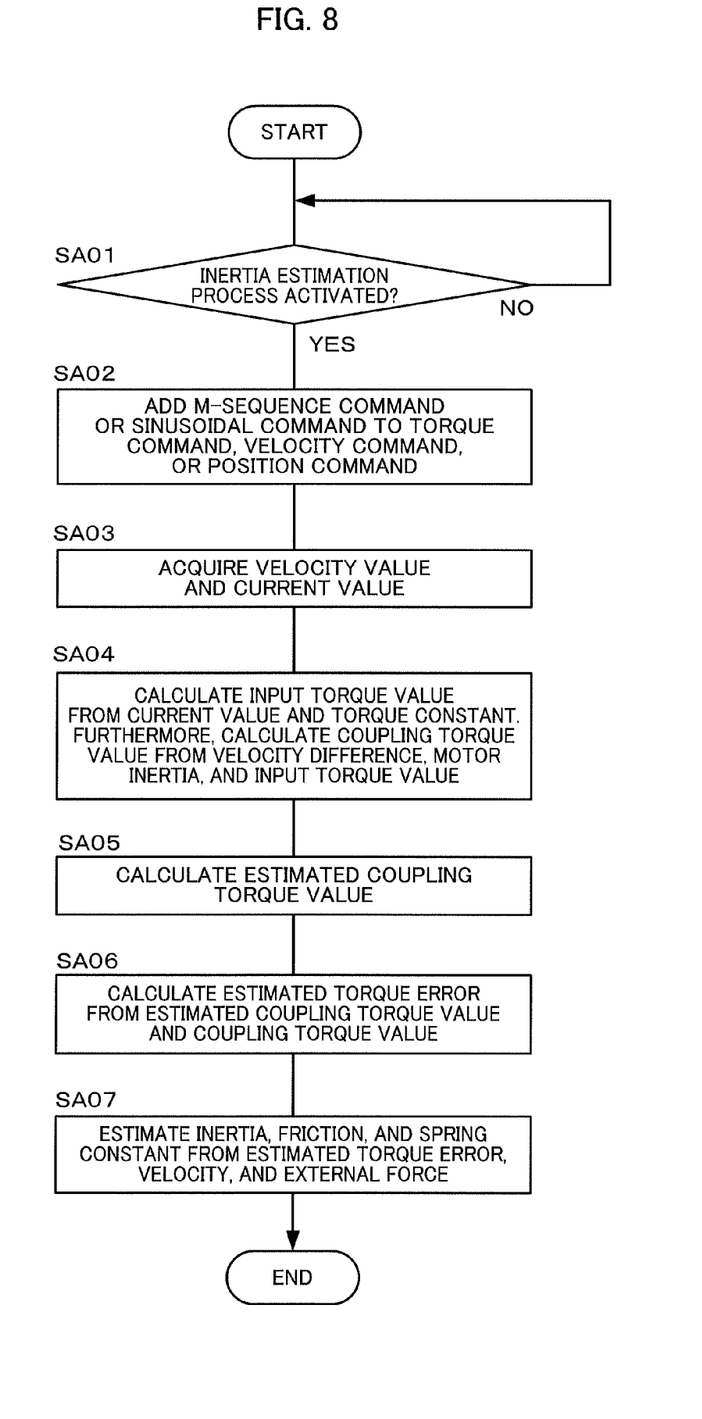
FIG. 8 is a flow chart of an estimation process of inertia, friction, and a spring constant performed by a servo control unit including an estimating unit.

FIG. 8 is a flow chart of an estimation process performed by a servo control unit including an estimating unit. Hereinafter, a step by step description will be given.

[Step SA01] A determination is made on whether an inertia estimation process has been activated or not. If activated (if the determination result is YES), a transition is made to Step SA02, and if not activated (if the determination result is NO), activation is awaited.

This step represents an operation for awaiting a start command from the higher-level controller 20 for the estimation process by the estimating unit 30. A start timing of the process of the estimating unit 30 can be set in advance to the higher-level controller 20 by an operator as one of the operations of the respective units in accordance with a process schedule. Alternatively, the higher-level controller 20 may be arranged to automatically judge a timing at which actual inertia Jms of the driven body 4 changes due to the attaching or detaching of a workpiece and to output a start command to the estimating unit 30.

[Step SA02] An M-sequence command or a sinusoidal command is added to a torque command, a velocity command, or a position command.

In this step, for example, when a start signal is inputted, the sinusoidal command generating unit 40 outputs a sinusoidal command having a predetermined frequency (for example, 10 Hz). The outputted sinusoidal command is added to a torque command outputted from the velocity control unit 12. At this point, the velocity control unit 12 is favorably controlled so as to output a constant torque command. Accordingly, operations of an estimation processes for inertia, friction, and a spring can always be kept the same to suppress dispersion in estimation accuracy.

[Step SA03] A velocity value and a current value are acquired.

[Step SA04] An input torque value is calculated from the current value and a torque constant. In addition, a coupling torque value is calculated from the input torque value, a difference in velocities, and motor inertia.

[Step SA05] An estimated coupling torque value is calculated.

[Step SA06] An estimated torque error is calculated from the estimated coupling torque value and the input torque value.

[Step SA07] Inertia, friction, and a spring constant are estimated from the estimated torque error, a velocity, and the coupling torque value. Subsequently, the process is terminated.

When a coupling between a driven body and an electric motor has resonance characteristics including a spring, the controller described above simultaneously estimates inertia, friction coefficient, and a spring constant. The controller can also accommodate a case where friction specifically has non-linear friction characteristics. Although it is a feature of the controller that the velocity of the driven body is not used to estimate the respective coefficients, when the spring constant is small or, in other words, when a coupling rigidity between the driven body and the electric motor is low, estimation accuracy is improved by providing a dead zone in an estimation algorithm.

However, a width of the dead zone may be affected by the spring constant (coupling rigidity). For example, when the spring constant is small, the width of the dead zone must be increased accordingly. Therefore, when the spring constant is completely unknown, an appropriate dead zone width cannot be set and may result in a significant error in estimation accuracy.

In consideration thereof, by using an estimated velocity of the driven body, estimation of a torque value can be enabled without the use of a dead zone or, in other words, without being dependent on a spring constant (coupling rigidity). Furthermore, since the estimated velocity of the driven body is estimated using a spring constant that is sequentially estimated, a feature is achieved in that estimation of the driven body can be performed without being dependent on a magnitude of a spring constant.

Figure 9:
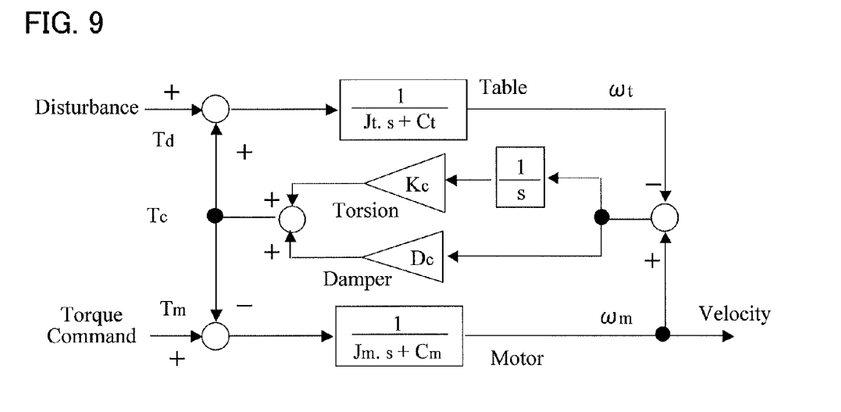
FIG. 9 is a block diagram illustrating a mechanical model.

Next, modeling of a controlled object, a definition of an inverse model thereof, and an estimation algorithm formula for respective coefficients of the inverse model will be described. An equation of motion of a mechanical model of this two-inertia system is as expressed by Formulas (3) to (5) below.

$$T_m(t) = J_m \cdot \frac{d\omega_m(t)}{dt} + C_m \cdot \omega_m(t) + T_c(t) \tag{3}$$

$$T_c(t) = K_c \cdot \int (\omega_m(t) - \omega_t(t)) \cdot dt + D_c \cdot (\omega_m(t) - \omega_t(t)) \tag{4}$$

$$T_d(t) = J_t \cdot \frac{d\omega_t(t)}{dt} + C_t \cdot \omega_t(t) - T_c(t) \tag{5}$$

In Formulas (3) to (5), Jm and Jt denote inertia, Kc denotes a spring constant, Cm and Ct denote friction coefficients, Dc denotes an internal damping coefficient, ωm and ωt denote velocities, Tm denotes an input torque, Td denotes a disturbance torque, and Tc denotes a coupling torque. In addition, a block diagram representation of the equation of motion is shown in FIG. 9. In this case, the suffix m of J, ω, and T denote an electric motor (motor) and the suffix t of J, ω, and C denote a driven body (table).

With a general machine tool, since friction of a linear guide of a table or a nut portion of a ball screw that is a driven body is dominant, other friction can be ignored. In the present invention, modeling is performed by including friction of a coupling shaft in friction of a driven body. Therefore, this mechanical model ignores the friction coefficient Cm and assumes that the internal damping coefficient Dc is included in the friction coefficient Ct. Moreover, the friction coefficient Ct of the table (driven body) is assumed as being nonlinear friction comprising a viscous friction coefficient C1 and a Coulomb's friction coefficient C2 as expressed by Formula (6) below.

$$C_t \cdot \omega_t(t) = C_1 \cdot \omega_t(t) + C_2 \cdot \mathrm{sgn}(\omega_t(t)) \tag{6}$$

In Formula (6), sgn( ) denotes a sign function expressed by Formula (7) below.

$$\mathrm{sgn}(x) = \begin{cases} 1 & (x > 0) \\ 0 & (x = 0) \\ -1 & (x < 0) \end{cases} \tag{7}$$

While the respective constants of the mechanical model are identified on-line (during operation of the machine) in this case, since a state free of disturbance such as processing load is assumed, disturbance Td can be ignored.

In summary, Formulas (3) to (5) can be described as Formulas (8) to (10) below using Formula (6). Moreover, Tm(t), Tc(t), Td(t), and Ct·ωt(t) denote functions of time t.

$$T_m(t) = J_m \cdot \frac{d\omega_m(t)}{dt} + T_c \tag{8}$$

$$T_c(t) = K_c \cdot \int (\omega_m(t) - \omega_t(t)) \cdot dt \tag{9}$$

$$T_c(t) = J_t \cdot \frac{d\omega_t(t)}{dt} + C_1 \cdot \omega_t(t) + C_2 \cdot \mathrm{sgn}(\omega_t(t)) \tag{10}$$

Figure 10:
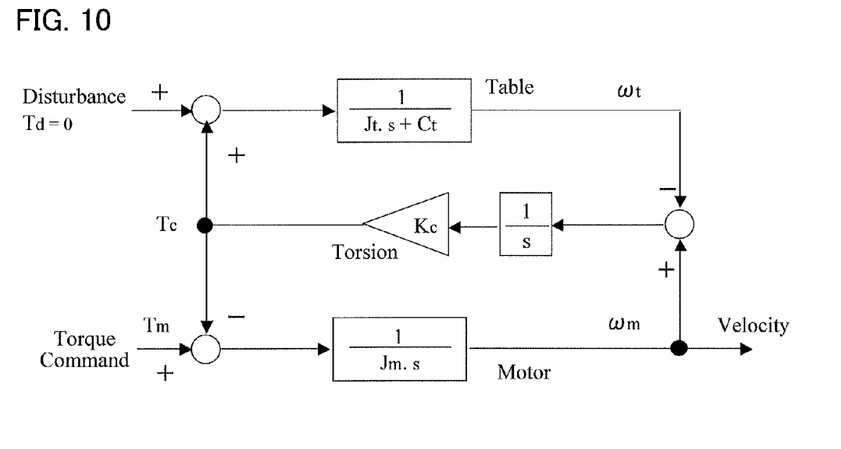
FIG. 10 is a block diagram illustrating a simplified mechanical model.
Figure 11:
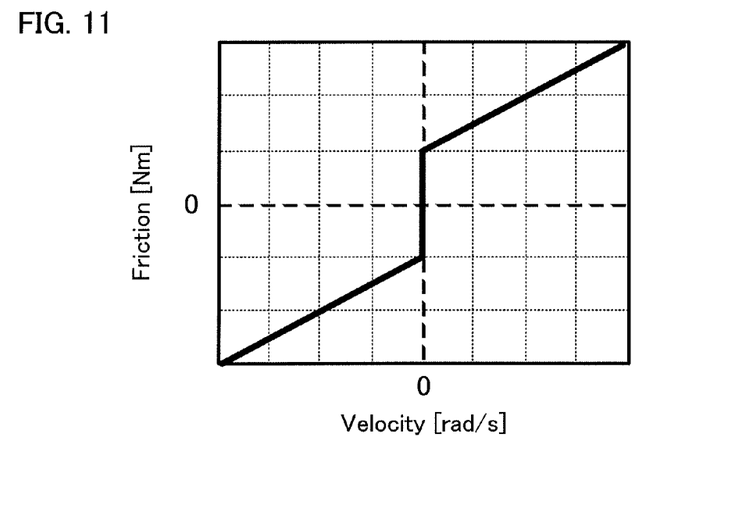
FIG. 11 is a diagram illustrating a simplified friction model having nonlinear characteristics.

In addition, a block diagram representation of the equation of motion is shown in FIG. 10 and is used as the mechanical model that is the controlled object. A method will now be proposed in which an inverse model of a two-inertia system mechanical model is loaded into control software to accurately identify, on-line, parameters of the inverse model in a short period of time. For identification, it is assumed that motor inertia Jm is known and table inertia, nonlinear friction, and a spring constant are identified. In particular, for friction, a simplified friction model having nonlinear characteristics and comprising only viscous friction and Coulomb's friction such as that shown in FIG. 11 is assumed.

For easy handling of nonlinear friction, a polynomial is generally used, but in the case of the present invention, such nonlinear friction is handled as-is (without modifying such a non-linearity) as expressed by Formula (6). This is because an advantage in implementation is conceivably gained by handling nonlinear friction as-is when considering a dynamic range on the control software and the like.

The inverse model used for parameter identification is expressed as Formula (10) above in which the table velocity ωt is assumed as input and the coupling torque Tc is assumed as output.

Discretization using backward difference to perform digital control by software enables a definition expressed by Formula (11) below, where T denotes a sampling period.

$$T_c(n) = \frac{J_t}{T} \cdot (\omega_t(n) - \omega_t(n-1)) + C_1 \cdot \omega_t(n) + C_2 \cdot \mathrm{sgn}(\omega_t(n)) \tag{11}$$

Although the table velocity ωt is observable by attaching a detector to the table, since a detector is often unavailable due to constraints in mechanism or cost, it is assumed that the table velocity ωt cannot be observed in this case. In consideration thereof, the table velocity ωt can be obtained from Formula (9) above as expressed by Formula (12) below.

$$\omega_t(t) = \omega_m(t) - \frac{d}{dt}\frac{T_c(t)}{K_c} \tag{12}$$

Discretization using backward difference results in Formula (13) below.

$$\omega_t(n) = \omega_m(n) - \frac{1}{K_c \cdot T}(T_c(n) - T_c(n-1)) \tag{13}$$

By substituting Formula (13) above into Formula (11) and then rearranging Formula (11), Formula (14) below is obtained. Formula (14) represents a definition of the inverse model used for parameter identification. In this case, an estimated coupling torque expressed as Tc with a superscripted "^" and a coupling torque Tc are distinguished from each other. "^" superscripted to Tc(n) in Formula (14) below signifies estimation. Hereinafter, Tc(n) with a superscripted "^" will be described as Tc(n) superscript "^".

$$\hat{T}_c(n) = \frac{J_t}{T} \cdot (\omega_m(n) - \omega_m(n-1)) + C_1 \cdot \omega_m(n) + \quad (14)$$
$$C_2 \cdot \text{sgn}\left(\omega_m(n) - \frac{1}{K_c \cdot T} \cdot (T_c(n) - T_c(n-1))\right) -$$
$$\frac{J_t}{K_c \cdot T^2} \cdot (T_c(n) - 2 \cdot T_c(n-1) + T_c(n-2)) -$$
$$\frac{C_1}{K_c \cdot T} \cdot (T_c(n) - T_c(n-1))$$

A practical method of sequentially identifying the respective coefficients of the inverse model expressed by Formula (14) using a steepest descent method will now be proposed. Using an observable motor velocity ωm and a coupling torque Tc that can be calculated from a similarly observable torque Tm and the velocity ωm as inputs to the inverse model, parameter identification is performed by sequentially updating the respective coefficients of the inverse model so that a difference between an estimated coupling torque Tc superscript "^" that is an output of the inverse model and the coupling torque Tc or, in other words, an identification error, is minimum.

The inverse model of Formula (14) above is arranged as Formula (15) below.

$$\hat{T}_c(n) = \sum_{m=0}^{4} (h_m \cdot v_m(n)) \quad (15)$$

In Formula (15), the respective coefficients are defined as follows.

$$h_0 = \frac{J_t}{T} \quad (16)$$
$$h_1 = C_1 \quad (17)$$
$$h_2 = C_2$$
$$h_3 = -\frac{J_t}{K_c \cdot T^2} \quad (19)$$
$$h_4 = -\frac{C_1}{K_c \cdot T} \quad (20)$$
$$v_0(n) = \omega_m(n) - \omega_m(n-1) \quad (21)$$
$$v_1(n) = \omega_m(n) \quad (22)$$
$$v_2(n) = \text{sgn}\left(\omega_m(n) - \frac{1}{K_c \cdot T} \cdot (T_c(n) - T_c(n-1))\right) \quad (23)$$
$$v_3(n) = (T_c(n) - 2 \cdot T_c(n-1) + T_c(n-2)) \quad (24)$$
$$v_4(n) = (T_c(n) - T_c(n-1)) \quad (25)$$

Moreover, $v_2$ defined in Formula (23) above becomes an input for identifying the Coulomb's friction coefficient C2 and signifies a polarity of the table velocity ωt. However, since Formula (23) above includes an unknown spring constant Kc, $v_2$ cannot be used as-is. Although $v_2$ can be treated as a polarity of the motor velocity ωm when the spring constant is large, an identification error is created when the spring constant is small.

Therefore, $v_2$ defined in Formula (23) above is estimated using a spring constant that is being sequentially estimated.

Since a sequentially estimated spring constant Kc with a superscripted "^" is estimated from h0 and h2 of an immediately previous sample, Formula (26) below is obtained from Formulas (16) and (19) above. In this case, "^" superscripted to Kc(n) signifies estimation in the same manner as Tc(n) superscript "^".

$$\hat{K}_c(n) = -\frac{h_0(n-1)}{h_3(n-1) \cdot T} \quad (26)$$

By substituting Formula (26) into Formula (23) above, Formula (27) below representing an estimation input is obtained.

$$v_2(n) = \text{sgn}\left(\omega_m(n) + \frac{\hat{h}_3(n-1)}{\hat{h}_0(n-1)} \cdot (T_c(n) - T_c(n-1))\right) \quad (27)$$

The coupling torque Tc can be obtained using Formula (28) below from an observable input torque Tm and a similarly observable motor velocity ωm.

$$T_c(n) = T_m(n) - J_m \cdot (\omega_m(n) - \omega_m(n-1)) \quad (28)$$

By denoting a difference between the coupling torque Tc and the estimated coupling torque Tc superscript "^" that is an output of the inverse model as an identification error e(n), the respective coefficients of the inverse model are updated by a steepest descent method algorithm as Formula (29) below. Accordingly, inertia, nonlinear friction, and a spring constant of the mechanical model can be simultaneously identified. Moreover, "^" superscripted to hm in Formulas (29) and (31) below also signifies estimation.

$$\hat{h}_m(n) = \hat{h}_m(n-1) + \mu(n) \cdot e(n) \cdot v_m(n) \text{ 但し }, e(n) = T_c(n) - \hat{T}_c(n) \quad (29)$$

Although μ is a coefficient for determining an identification velocity, μ is sequentially varied as expressed by Formula (30) below so as to prevent the identification velocity from affecting input magnitude.

$$\mu_m(n) = \frac{\eta}{1 + \sum_{m=0}^{3} v_m(n)^2} \quad (30)$$

In this case, η denotes a positive constant. Since coefficient h4 in Formula (20) can be calculated as h4=h1*h3/h0, the coefficient h4 need not be identified. Therefore, a final online identification formula of the inverse model can be expressed as Formula (31) below, where "·" signifies multiplication.

$$\hat{h}_m(n) = \sum_{m=0}^{3} \mu_m(n) \cdot e(n) \cdot v_m(n) \quad (31)$$

Formula (15) above corresponds to Formula (1) and Formulas (30) and (31) above correspond to Formula (2).

Since a flow chart of a process performed by the servo processing unit including the estimating unit is similar to that shown in FIG. 8, a description thereof will be omitted.

What is claimed is:

1. An electric motor controller for controlling an electric motor configured to drive a driven body of a machine tool or industrial machinery, wherein the driven body and the electric motor are coupled to each other by a coupling shaft which has resonance characteristics including a spring, in a servo system including a ball screw and/or decelerator that is estimated as a model of torque from inertia, friction and a spring of motion of the driven body, the controller comprising:
- a command unit configured to add an M-sequence command or a sinusoidal command to a position command, a velocity command, or a torque command of the controller;
- a current value acquiring unit configured to acquire a current value of a current flowing through the electric motor for each sampling period;
- an input torque calculating unit configured to calculate an input torque value of an input torque to the driven body based on the current value and a torque constant of the electric motor;
- a velocity acquiring unit configured to acquire a velocity of the electric motor for each sampling period;
- a coupling torque calculating unit configured to calculate a coupling torque value of a coupling torque produced by a difference between motion of the electric motor and the motion of the driven body, based on
  - a difference between a velocity acquired by the velocity acquiring unit during a present sampling period and a velocity acquired by the velocity acquiring unit during a previous sampling period,
  - inertia of the electric motor, and
  - the input torque value calculated by the input torque calculating unit;
- an estimated coupling torque calculating unit configured to estimate
  - an inertia of the driven body,
  - a viscous friction coefficient of the driven body,
  - a Coulomb's friction coefficient of the driven body, and
  - a spring constant of the spring of the coupling shaft, and calculate an estimated coupling torque value from
  - the velocity of the electric motor,
  - the coupling torque value,
  - the estimated inertia of the driven body,
  - the estimated viscous friction coefficient of the driven body,
  - the estimated Coulomb's friction coefficient of the driven body, and
  - the estimated spring constant of the spring of the coupling shaft;
- an estimated torque error calculating unit configured to calculate an estimated torque error from a difference between the coupling torque value and the estimated coupling torque value; and
- a correcting unit configured to correct (i) the estimated inertia, (ii) the estimated viscous friction coefficient, (iii) the estimated Coulomb's friction coefficient, and (iv) the estimated spring constant for each sampling period, by using the velocity and the coupling torque value, so that the estimated torque error calculated by the estimated torque error calculating unit is minimum.

2. The electric motor controller according to claim 1, wherein the estimated coupling torque calculating unit is configured to obtain the estimated coupling torque value based on:
- a product of the estimated inertia and the difference between the velocity acquired for the current sampling period and the velocity acquired for the previous sampling period;
- a product of the velocity acquired for each sampling period and the estimated viscous friction coefficient of the driven body;
- a product of a polarity of the velocity acquired for each sampling period and the estimated Coulomb's friction coefficient of the driven body;
- a product of a reciprocal of the estimated spring constant and a second-order difference of coupling torque values; and
- a product of the estimated viscous friction coefficient of the driven body, the reciprocal of the estimated spring constant, and a difference in the coupling torque values.

3. The electric motor controller according to claim 1, wherein
the correcting unit is configured to correct the estimated inertia of the driven body, the estimated viscous friction, the estimated Coulomb's friction coefficient, and the estimated spring constant for each sampling period by using (a) the velocity of the electric motor, (b) the coupling torque value, and (c) an accommodation coefficient so that the estimated torque error calculated by the estimated torque error calculating unit is minimum, and
the accommodation coefficient is inversely proportional to magnitudes of the velocity and the coupling torque value and has a dead zone in which the accommodation coefficient is zero when the velocity is equal to or lower than a predetermined value.

4. The electric motor controller according to claim 1, wherein the estimated coupling torque calculating unit is configured to calculate the estimated coupling torque value based on
- an estimated velocity of the driven body,
- the velocity of the electric motor,
- the coupling torque value,
- the estimated inertia of the driven body,
- the estimated viscous friction of the driven body,
- the estimated Coulomb's friction of the driven body, and
- the estimated spring constant of the spring of the coupling shaft.

5. The electric motor controller according to claim 4, wherein
the estimated velocity of the driven body is obtained using
- the velocity of the electric motor acquired for each sampling period,
- the coupling torque value, and
- the estimated spring constant at the time of the previous sampling period.

6. The electric motor controller according to claim 2, wherein
the correcting unit is configured to correct the estimated inertia of the driven body, the estimated viscous friction, the estimated Coulomb's friction coefficient, and the estimated spring constant for each sampling period by using (a) the velocity of the electric motor, (b) the coupling torque value, and (c) an accommodation coefficient so that the estimated torque error calculated by the estimated torque error calculating unit is minimum, and
the accommodation coefficient is inversely proportional to magnitudes of the velocity and the coupling torque value and has a dead zone in which the accommodation coefficient is zero when the velocity is equal to or lower than a predetermined value.

* * * * *